United States Patent [19]

Pillage et al.

[11] Patent Number: 4,683,989

[45] Date of Patent: Aug. 4, 1987

[54] ELEVATOR COMMUNICATION CONTROLLER

[75] Inventors: Lawrence T. Pillage, Monroeville; Arthur A. Anderson, Plum Borough, both of Pa.

[73] Assignee: Westinghouse Electric Corp., Pittsburgh, Pa.

[21] Appl. No.: 829,744

[22] Filed: Feb. 14, 1986

[51] Int. Cl.[4] .......................... B66B 1/14; G06F 15/20

[52] U.S. Cl. .................................... 187/121; 187/130; 364/178

[58] Field of Search ............... 187/101, 121, 124, 130; 364/178, 572, 574

[56] References Cited

U.S. PATENT DOCUMENTS

| | | | |
|---|---|---|---|
| 3,782,504 | 1/1974 | Billmaier et al. | 187/121 |
| 3,828,892 | 8/1974 | Winkler et al. | 187/121 |
| 3,841,443 | 10/1974 | Booker, Jr. | 187/121 |
| 3,851,735 | 12/1974 | Winkler et al. | 187/121 |
| 3,903,499 | 9/1975 | Oliver | 187/121 |
| 4,415,968 | 11/1983 | Maeda et al. | 364/178 |
| 4,462,081 | 7/1984 | Lehan | 364/572 X |
| 4,473,133 | 9/1984 | Enriquez et al. | 187/101 |
| 4,497,391 | 2/1985 | Mendelsohn et al. | 187/121 |
| 4,555,689 | 11/1985 | Brick et al. | 187/133 |

*Primary Examiner*—William M. Shoop, Jr.
*Assistant Examiner*—W. E. Duncanson, Jr.
*Attorney, Agent, or Firm*—D. R. Lackey

[57] ABSTRACT

An addressable elevator communication controller which, when addressed by a valid input message, prepares a return message and has its return data interface enabled for one message. The return message is automatically clocked out of the communication controller via the enabled return data interface as the next input message is clocked into the controller, regardless of whether the incoming message is addressed to this communication controller or to another communication controller. The communication controller is operable in one of two completely different modes, simply by controlling the logic level of one input pin. Input messages, as well as message clocking input pulses, are screened through digital correlators which discriminate actual signals from line noise.

15 Claims, 16 Drawing Figures

ELEVATOR COMMUNICATION CONTROLLER

BACKGROUND OF THE INVENTION

1. Field of the Invention

The invention relates in general to elevator systems, and more specifically to communication control apparatus for controlling the communication between an elevator bank controller and remote elevator fixtures.

2. Description of the Prior Art

Elevator systems require fast, accurate communication between the central elevator bank controller which controls a bank of elevator cars and the various remotely located elevator related fixtures. These fixtures include the hall call pushbuttons and associated indicator lamps located at each floor of the building, the up and down hall lanterns located at each floor, digital or horizontal car position indicators and status panels located at selected floors, and the various elevator car located functions such as the door controller, car position indicator, direction arrows, and the car call pushbuttons and associated indicator lamps.

To reduce manufacturing, installation and maintenance costs while increasing communication speed and accuracy, it would be desirable to provide a new and improved universal elevator communication controller which will handle any elevator fixture function it is dedicated to. The universality has the economic advantage of being able to place the communication controller on a single IC chip which may be mass produced to provide an attractive unit cost.

SUMMARY OF THE INVENTION

Briefly, the present invention is a new and improved addressable elevator communication controller which may be used for either floor controller type functions (FC), or for position indicator type functions (PI), simply by selecting the logic level applied to a single input terminal. The data link from the central elevator bank controller requires only three differential pairs of wires, with one pair being a message clock line controlled by the bank controller, another pair being for messages prepared by the bank controller which are addressed to a specific communication controller (input messages), and the remaining pair being for messages prepared by the remote communication controllers destined for the elevator bank controller (output messages). Communication controllers of both the FC and PI modes are connected to the same data link, even though the input messages for the two modes have different bit links. Output messages from both modes have like bit lengths.

Full duplex communication is provided between the bank controller and the remote communication controllers, i.e., the clock pulses which clock an input message to an addressed communication controller simultaneously clock an output message from a communication controller to the bank controller. If the input message being clocked is referred to as message number X, the simultaneous output message is always from the communication controller which received the immediately prior input message, i.e., message number $X-1$.

In order to discriminate between line noise and valid information in the data link, each communication controller includes digital correlators which sample the clock and input message lines at a rate which is substantially higher than the clock and message rate. Each digital correlator saves the last N samples. When a predetermined number of the last N samples has a predetermined logic level, the output of the correlator changes logic levels. The new output logic level from the correlator persists until the number of saved samples having the predetermined logic level falls below the predetermined number.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENT

Figure 1:
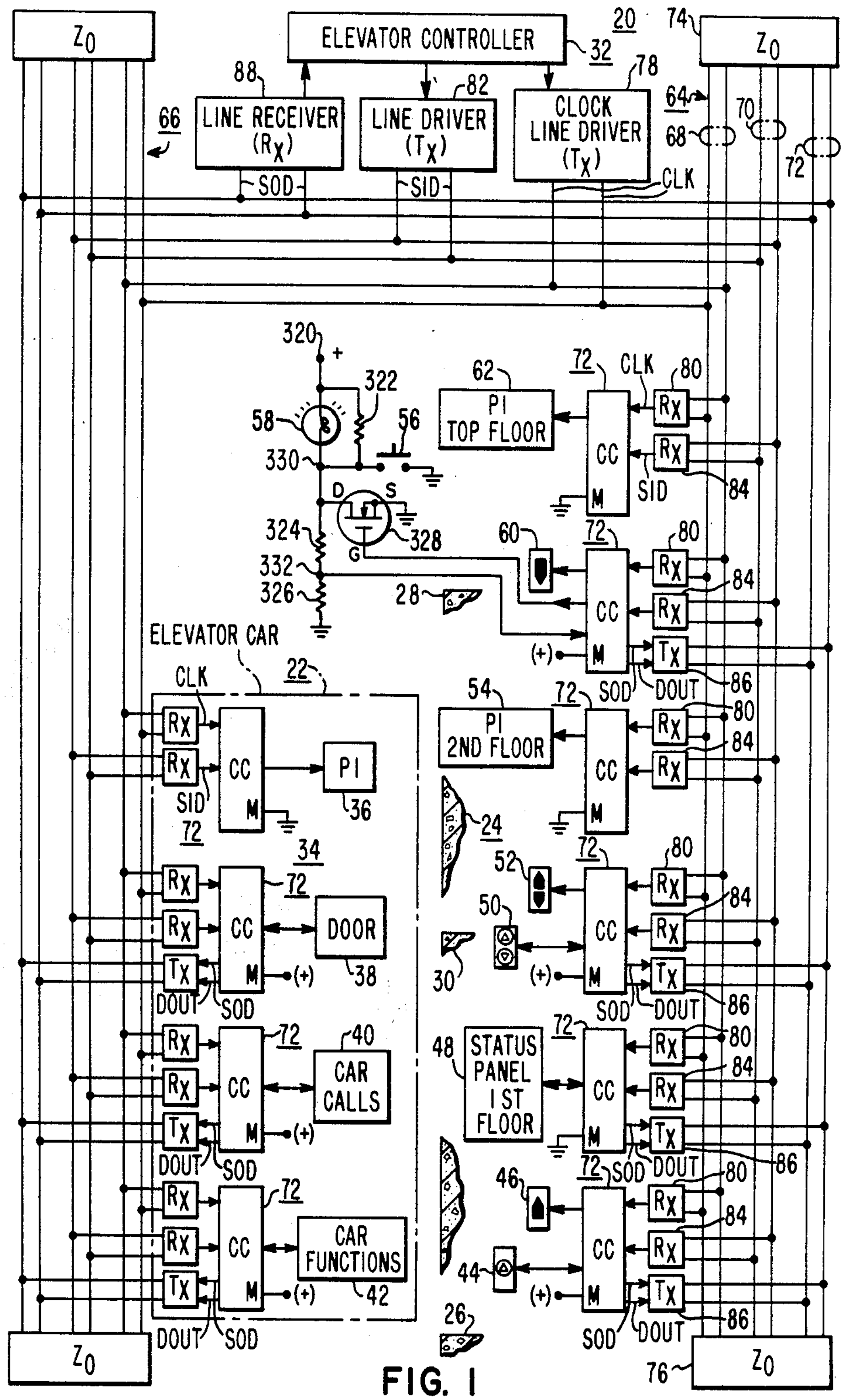
FIG. 1 is a block diagram of an elevator system having a plurality of communication controllers connected to an elevator bank controller.

Referring now to the drawings, and to FIG. 1 in particular, there is shown an elevator system 20 which may have communication controllers constructed according to the teachings of the invention. Elevator system 20 includes one or more elevator cars, such as elevator car 22 mounted in a building 24 having a plurality of floors, such as the first floor 26, an uppermost floor 28 and a plurality of intermediate floors, such as the second floor 30. The elevator cars are under the supervision of a group or bank controller 32 which is in two-way communication with the car controller of each elevator car, such as car controller 34 associated with elevator car 22. Car controller 34, for example, may include a car position indicator 36, a door controller 38, car call control 40 and various other car functions, shown generally at 42, such as the control for detecting hatch switches.

Bank controller 32 is also in two-way communication with the elevator fixtures located at the various floors at the building 24. For example, the first floor 26 may include an up hall call pushbutton and associated indicator lamp, shown generally at 44, an up hall lantern 46, and a status panel 48 which includes a position indicator for each elevator car. The second floor 30, and other intermediate floors, include up and down hall call pushbuttons and associated indicator lamps, shown generally at 50, and up and down hall lanterns 52. A digital or horizontal car position indicator 54 may also be provided. The uppermost floor 28 includes a down hall call pushbutton 56, an indicator lamp 58 associated with pushbutton 56, a down hall lantern 60, and a car position indicator 62.

In accordance with the teachings of the invention, the elevator controller 32 communicates with the various elevator fixtures and functions via one or more data links, such as data link 64 for the floor related functions, and data link 66 for the elevator car related functions. It would also be suitable to use a single data link for all car and floor related functions, as desired. The data links are of like construction, and thus only data link 64 will be described in detail.

Data link 64 includes first, second and third differential pairs 68, 70 and 72, respectively, which may be flat or twisted cable, as desired. The extreme ends of the differential pairs or cables are terminated in terms of their characteristic impedance $Z_O$, as illustrated at 74 and 76.

The various car and floor related functions are controlled by a plurality of universal, addressable elevator communication controllers 72. Communication controllers 72 are of like construction regardless of the specific communications being controlled, thus making it attractive to place each communication controller 72 on a single IC chip.

The first differential pair 68 carries message clocking pulses CLK from elevator controller 32 to each communication controller 72. A clock line driver 78, such as Texas Instruments' SN75174B, connects elevator controller 32 to the first differential pair 68. A receiver 80, such as Texas Instruments' SN75175A, connects the first differential pair 68 to each communication controller 72.

The second differential pair 70 carries serial messages SID from elevator controller 32 to each communication controller 72. A line driver 82 connects elevator controller 32 to the second differential pair 70, and a receiver 84 connects the second differential pair 70 to each communication controller 72.

The third differential pair 72 carries serial messages SOD from certain of the communication controllers 72 to the elevator controller 32. For those communication controllers 72 having sensing functions for constructing return messages SOD, a line driver 86 connects the communication controller 72 to the third differential pair 72, and a receiver 88 connects the third differential pair 72 to the elevator controller 32.

Any suitable format for the clock pulses CLK, the input messages SID and the output messages SOD may be used, with FIGS. 1A–1E setting forth exemplary formats. If the communication function being controlled includes car position indicators, which will be assumed to include two-fourteen segment common cathode devices which form the least significant (LS) and most significant (MS) digits of the indicator, the SID message will contain forty bits, and if the SID message is destined for a function which has no position indicator function, the SID message will have twenty bits.

Each communication controller 72 has a single mode terminal or pin M. If the mode pin M is grounded, the associated controller 72 will function in position indicator (PI) mode, and it will respond only to SID messages which are forty bits in length. If the mode pin M is at the logic one voltage level, the associated communication controller 72 is in floor controller (FC) mode, and it will respond only to SID messages which are twenty bits in length. The serial return messages SOD are twenty bits in length in both the PI and FC modes.

Figure 1A:
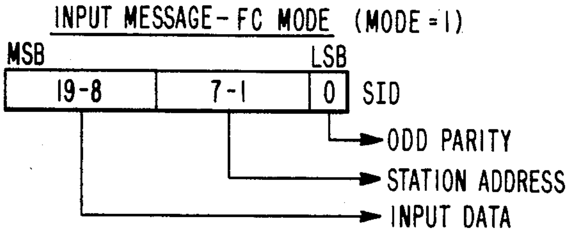
FIGS. 1A-1E illustrate message formats which may be used in the elevator communication system of FIG. 1.

FIG. 1A sets forth a twenty-bit format for an input message SID for a communication controller 72 in FC mode, with the least significant bit (LSB) being an odd parity bit, bit positions 1–7 defining the station address of the communication controller 72 which the message is being directed to, and bit positions 8–19 carrying input data to the addressed communication controller 72.

Figure 1B:
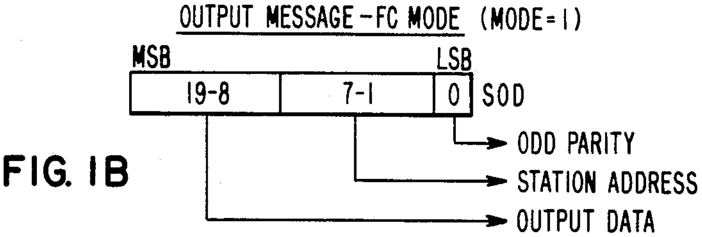

FIG. 1B sets forth a twenty-bit format for an output message SOD from a communication controller 72 in FC mode, with the LSB being an odd parity bit, bit positions 1–7 defining the station address of the communication controller which is sending the message, and bit positions 8–19 carrying sensed output data.

Figure 1C:
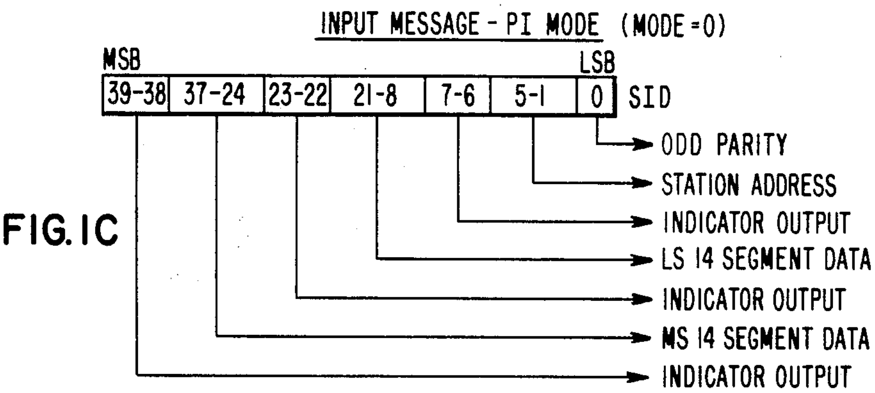

FIG. 1C sets forth a forty-bit format for an input message SID for a communication controller 72 which is in PI mode, with the LSB being an odd parity bit, bit positions 1–5 defining the station address the message is addressed to, bit positions 6 and 7 being indicator outputs, bit positions 8–21 containing data for the LS digit of the car position indicator, bit positions 22 and 23 being indicator outputs, bit positions 24–37 containing data for the MS digit of the car position indicator, and bit positions 38 and 39 being indicator outputs. Indicator outputs include such functions as up and down travel direction arrows, car in-service indicators, and the like.

Figure 1D:
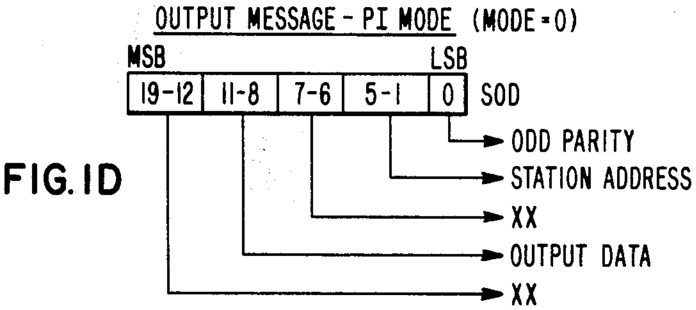

FIG. 1D sets forth a twenty-bit format for an output message SOD prepared by a communication controller 72 which is in PI mode. The LSB is an odd parity bit, bit positions 1–5 contain the station address, bit positions 6 and 7 are unused, bit positions 8–11 contain sensed data, and bit positions 12–19 are unused.

Figure 1E:
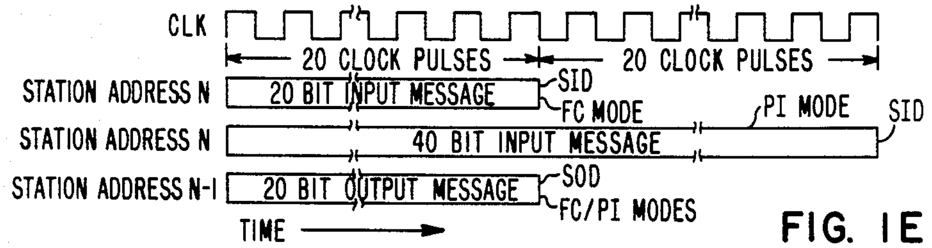

FIG. 1E is a graph which illustrates that twenty clock pulses CLK are provided by elevator controller 32 to clock a serial message SID to a communication controller 72 which is in FC mode, and that forty clock pulses CLK are provided by elevator controller 32 to clock a serial message SID to a communication controller 72 which is in PI mode. The first twenty clock pulses simultaneously clock a serial output message SOD from a previously enabled communication controller 72, regardless of the mode which this previously enabled communication controller is operating in. If the input message SID is message number N, the simultaneous output message SOD is always from the communication controller 72 addressed in message number N-1, i.e., the message immediately preceding message number N.

Figure 2:
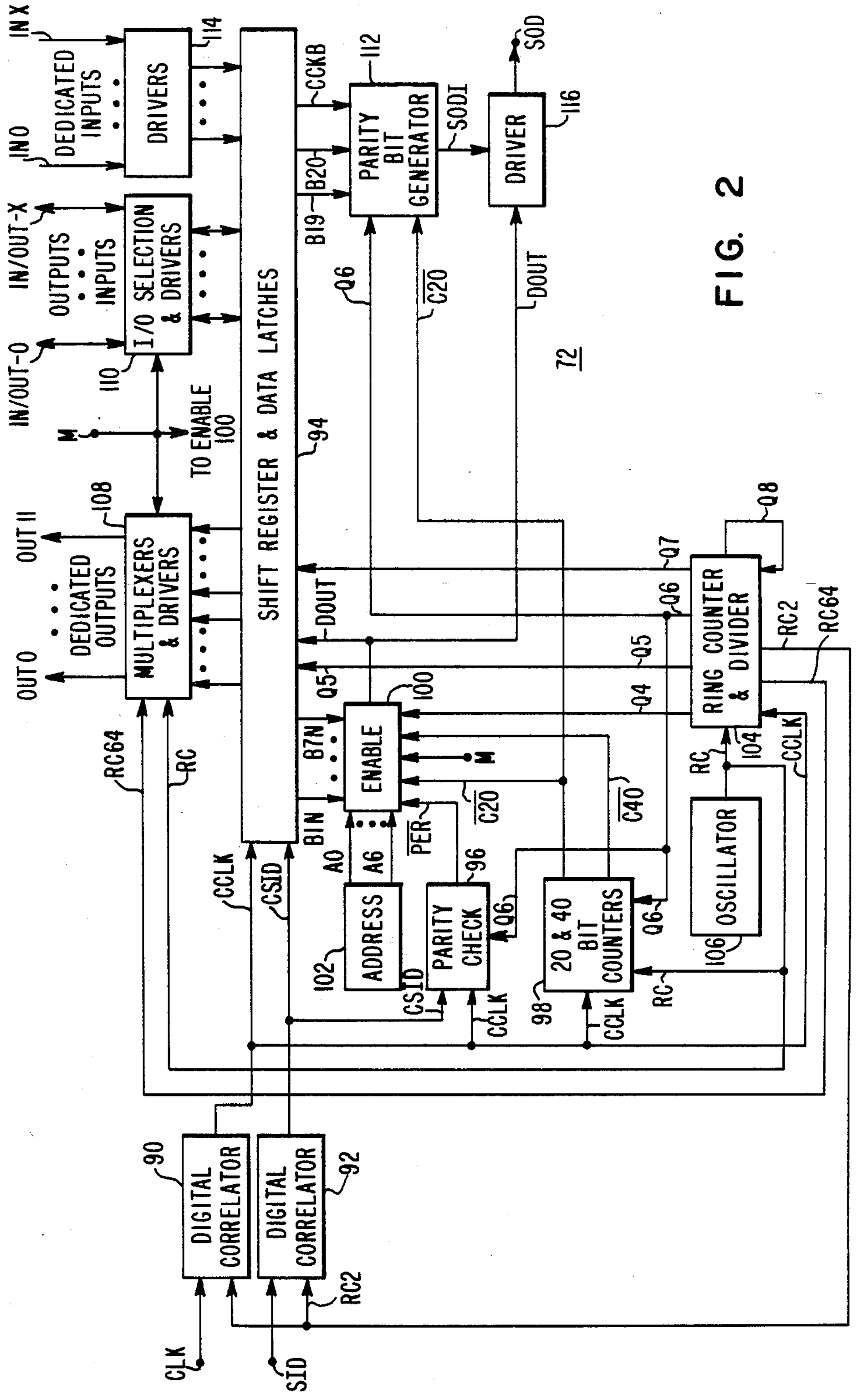
FIG. 2 is a detailed block diagram of a communication controller constructed according to the teachings of the invention, which may be used for each of the communication controllers shown in block form in FIG. 1.

FIG. 2 is a detailed block diagram of a communication controller 72 constructed according to the teachings of the invention. FIG. 2 will first be described in its entirety to provide a complete, overall description of the invention, before the functional blocks are described in detail. When elevator controller 32 shown in FIG. 1 desires to send a serial message to a specific communication controller 72, which can be a twenty-bit message to communication controllers associated with FC functions, or a forty-bit message to communication controllers associated with PI functions, the appropriate number of serial clock pulses CLK are provided on differential pair 68 of the appropriate data link 64 or 66, while simultaneously providing a serial message SID of like bit length on differential pair 70. Receivers 80 and 84 provide a clock signal CLK and a message signal SID, respectively, at input terminals having these reference identifications in FIG. 2. In order to discriminate between line noise and signals CLK and SID are applied to digital correlators 90 and 92 via hysteresis inputs (not shown), to block line noise and pass only valid input signals CCLK and CSID. Digital correlators 90 and 92 are of like construction, with digital correlator 90 being shown in detail in FIG. 3.

Serial input message CSID, regardless of bit length, is clocked into functional block 94 which includes a shift register and data latches. Function 94 is shown in detail in FIG. 8.

Figure 5:
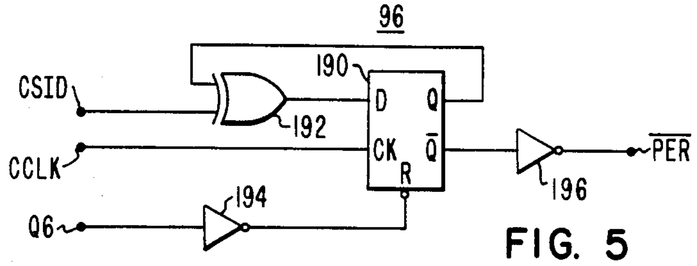
FIG. 5 is a schematic diagram of a parity checking circuit which may be used for this function which is shown in block form in FIG. 2.

The parity of the serial message CSID is checked in a parity checking function 96, which is shown in detail in FIG. 5. If the parity of the message is correct, function 96 provides a signal $\overline{PER}$ at the logic one level.

The number of clock pulses in the serial string CCLK is counted in a counting function 98. The counting function is not shown in detail as it is simply provided by a six-bit digital counter with logic gates connected to provide a signal $\overline{C20}$ which is a logic zero when the count stops at twenty, and a signal $\overline{C40}$ which is a logic zero when the count stops at 40. The counters do not count around, i.e., $\overline{C20}$ is not low at 40 pulses, nor is $\overline{C40}$ low at 80 pulses.

Figure 7:
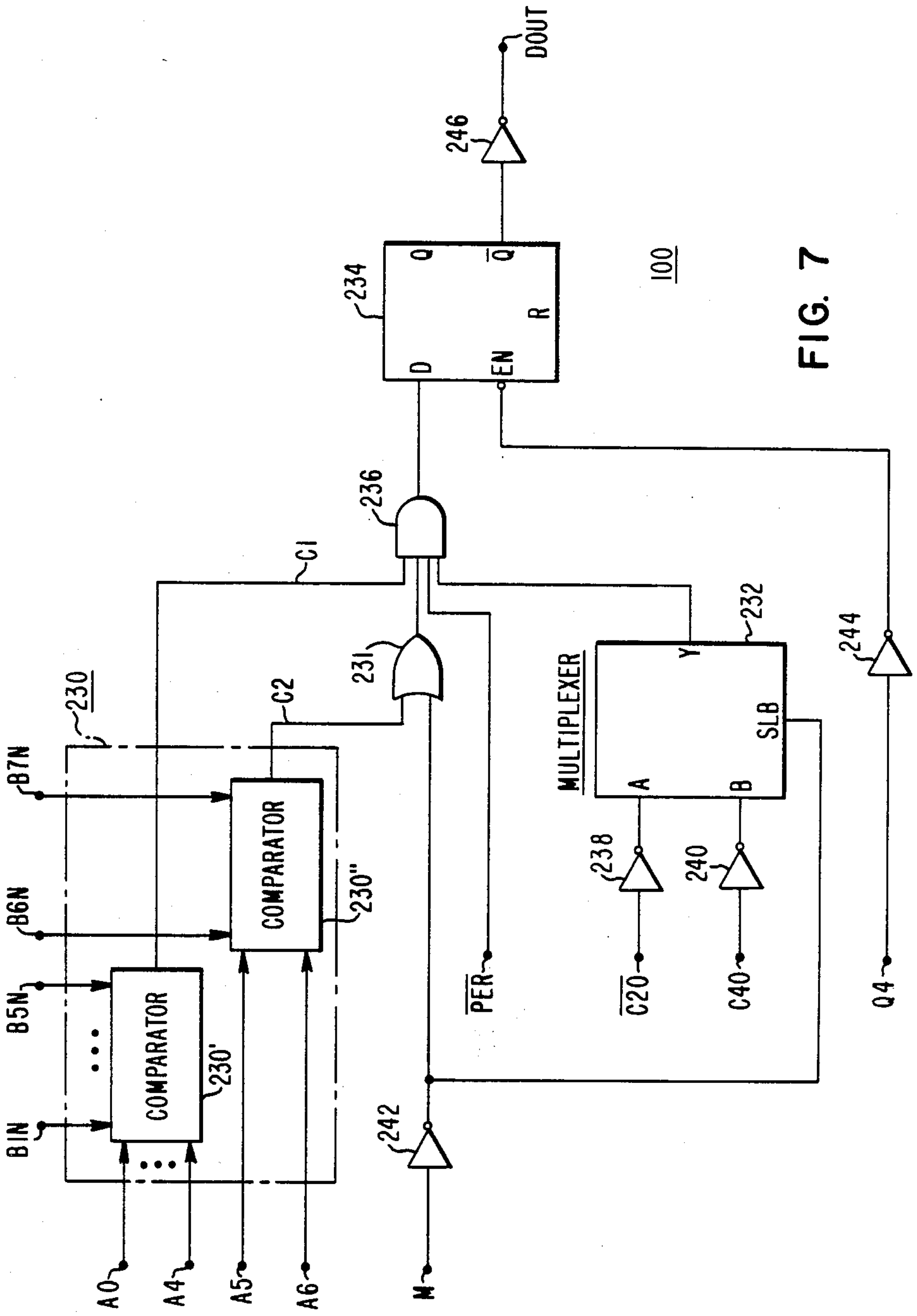
FIG. 7 is a schematic diagram of an enable circuit which may be used for this function which is shown in block form in FIG. 2.

The parity signal $\overline{PER}$ from function 96 and the clock count signals $\overline{C20}$ and $\overline{C40}$ from function 98 are applied to an enable function 100. Enable function 100, which is shown in detail in FIG. 7, compares its unique station address A0–A6 (A0–A4 for PI mode) with the address bits in the address field of the message CSID. The station address A0–A6 is provided by function 102, which may be a thumb switch. The address bits are bit numbers 1–7 in FC mode, and bit numbers 1–5 in PI mode, with the seven possible address bits appearing at output terminals B1N–B7N of function 94. The enable function 100 is also responsive to the level of the voltage of the input pin M. It will be recalled that pin M is grounded to cause communication controller 72 to function in PI mode, and it is at the logic one level for FC mode. The voltage level of pin M selects input signal $\overline{C20}$ in FC mode, and input signal $\overline{C40}$ in PI mode. Enable function 100 provides a true enable signal DOUT, i.e., it is at the logic one level, only when all of the following conditions occur: (1) the address in the address field of message CSID correctly matches the station address; (2) the parity of the message CSID is correct, i.e., signal $\overline{PER}$ is a logic one; and (3) the correct number of clock pulses CCLK has been received according to the logic level of input pin M. If pin M is high, signal $\overline{C20}$ must be low, and if pin M is low, signal $\overline{C40}$ must be low.

Figure 6:
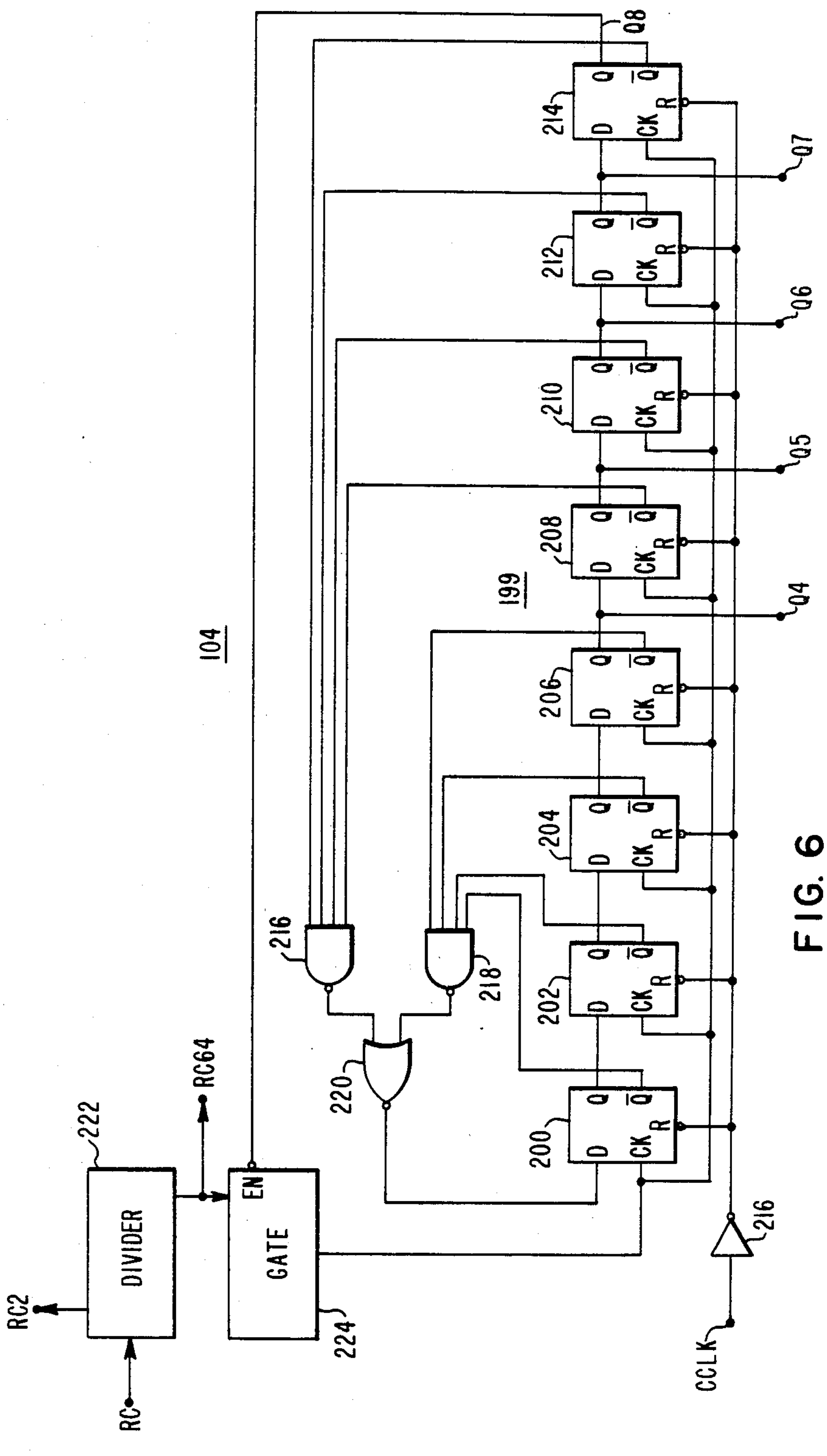
FIG. 6 is a schematic diagram of a ring counter and divider which may be used for this function which is shown in block form in FIG. 2.

The various functions of communication controller 72 are properly sequenced and synchronized by a ring counter and divider function 104, which is shown in detail in FIG. 6. An oscillator 106, such as may be provided by an external RC network, or by a crystal, provides a clock signal RC which is selected to be substantially greater than the rate of the message clock CLK, such as 64 times greater. Clock RC is divided by two to provide clock RC2, which is used by the digital correlators 90 and 92, and clock RC is divided to provide a clock RC64 which has the same nominal rate as the message clock CLK. Clock RC64 clocks the ring counter of function 104, with the ring counter being reset by each message clock pulse CCLK. Thus, the clocking of input message CSID must end and three clock pulses CCLK must be missing, before ring counter function 104 provides a first true output Q4. Three missing clock pulses CCLK thus frames a message CSID. The communication controller 72 can be interrupted, i.e., not lose the data or frame the message, when the input clock CLK is held high indefinitely. Adjacent messages CSID must be separated by at least nine missing clock pulses, to complete the message processing functions of communication controller 72. The signal Q4, when true, causes the enable function 100 to make the address comparison, with signal DOUT going true when signal Q4 goes true, assuming of course that a valid message directed to this specific communication controller 72 has been received.

Signal Q5 provided by ring counter function 104 then goes true. If the enable signal DOUT is also true, true signals Q5 and DOUT are logically combined to cause the data latches of function 94 to latch the data bits in the data field of the message CSID being held in the shift register of function 94. The data bits are bit numbers 8–19 of a twenty-bit message, and bit numbers 6–39 of a forty-bit message.

Figure 10:
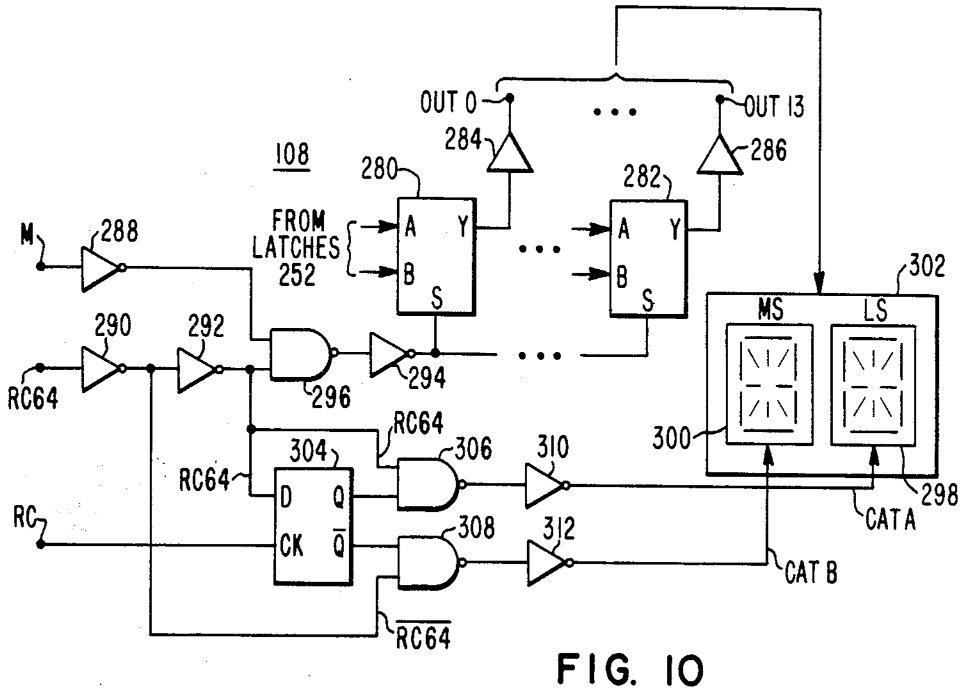
FIG. 10 is a schematic diagram of a multiplexer and driver circuit which may be used for this function which is shown in block form in FIG. 2.

The data latches of function 94 are connected to a multiplexer and driver function 108, which is shown in detail in FIG. 10. Function 108 includes at least fourteen dedicated outputs OUT0–OUT13. The data latches of function 34 are also connected to an I/O selection and driver function 110 which includes terminals IN/OUT-O through IN/OUT-X, which function as outputs in PI mode and as inputs in FC mode. The voltage level of mode pin M performs the I/O selection in function 110.

Function 108 multiplexes the data held in twenty-eight latches to provide fourteen outputs when the communication controller 72 is in PI mode. In other words, each of the fourteen outputs OUT0 through OUT13 provides time multiplexed data from two data latches. In FC mode, data held by fourteen latches in function 94 appears at the fourteen dedicated outputs OUT0–OUT13.

Signal Q6 now goes true to reset the parity check function 96 and the clock counter function 98, to prepare them for the next serial message. Serial Q6 also resets and prepares a parity bit generator function 112, which is shown in detail in FIG. 9.

Signal Q7 from function 104 now goes true, which parallel loads sensed data from dedicated inputs INO–INX and driver function 114 into the data bit locations 8–19 of the shift register function 94.

A true enable signal DOUT enables a tri-state driver 116 for one output message. Driver 116 receives serial data SODI from the parity bit generator function 112 and applies it to output terminal SOD. The clocking of the next message into shift register function 94 by message clock pulses CCLK also clocks the serial message previously prepared in shift register function 94 out of terminal B20. The message clock CCLK is also used to generate a related clock signal CCKB which is used in the function of preparing a parity bit for the outgoing message. Output terminal B19 is also used to keep track of the message parity, so that a parity bit of the correct logic level may be added to the LSB of the outgoing message. As hereinbefore stated, the serial output message SOD is always twenty bits in length, regardless of the voltage level of the mode selection pin M, and thus the output message SOD will always be properly clocked out regardless of the bit length of the incoming message SID.

Figure 3:
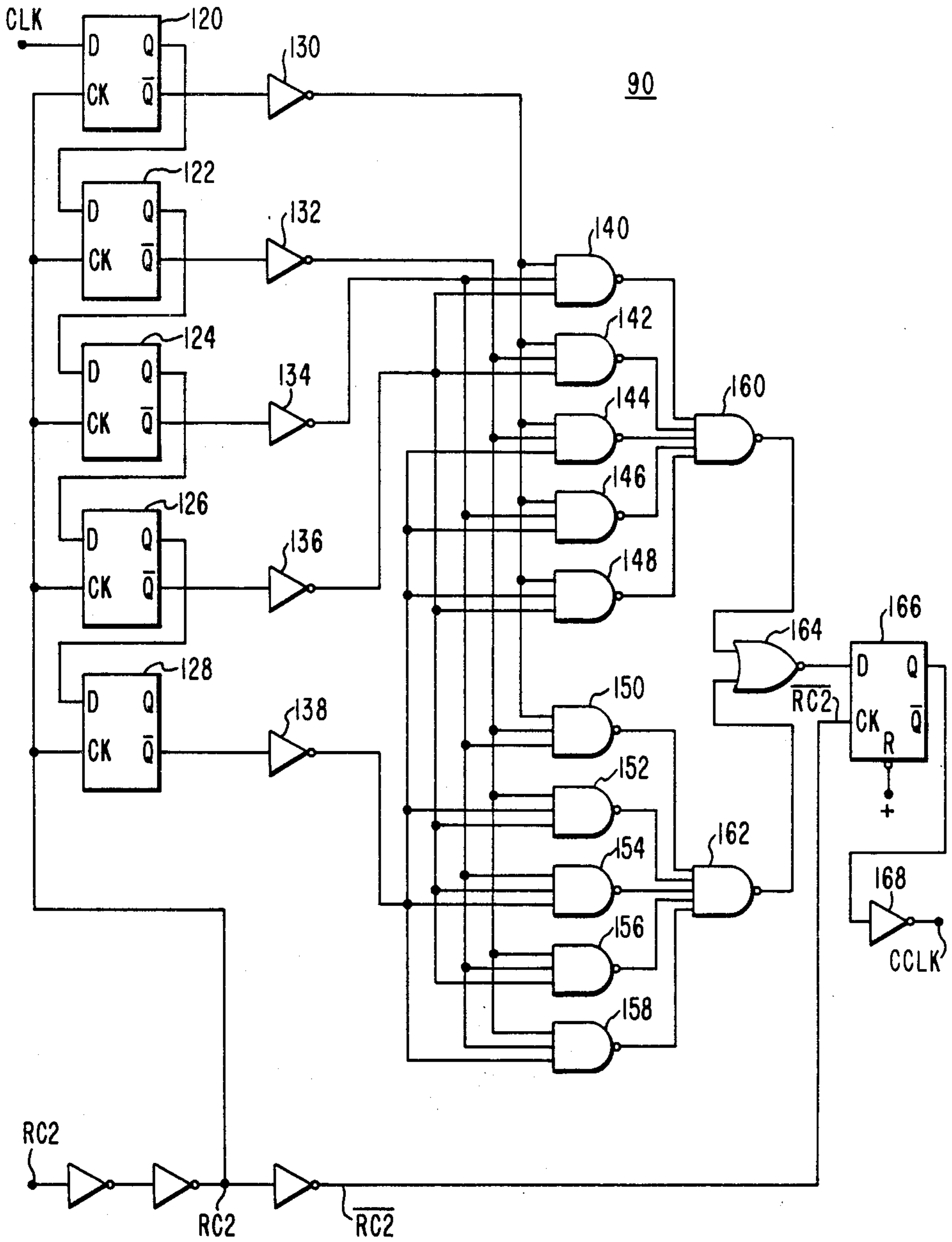
FIG. 3 is a schematic diagram of a digital correlator constructed according to the teachings of the invention, which may be used for the digital correlators shown in block form in FIG. 2.
Figure 4:
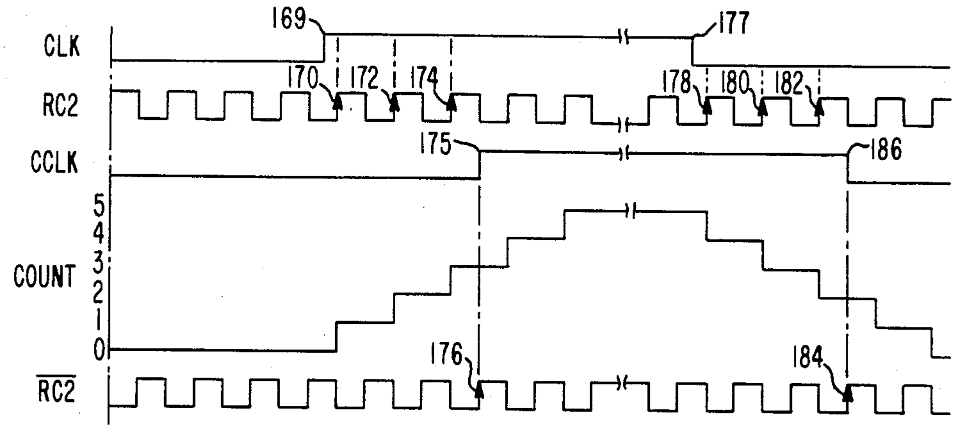
FIG. 4 is a graph which illustrates the operation of the digital correlator shown in FIG. 3.

FIG. 3 is a schematic diagram of a digital correlator constructed according to the teachings of the invention, which may be used to provide the digital correlator functions 90 and 92 shown in FIG. 2. Since digital correlators 90 and 92 are of like construction, only digital correlator 90 will be described in detail. FIG. 4 is a graph which will aid in understanding the operation of digital correlator 90.

Functionally, digital correlator 90 samples the clock input CLK at a rate which greatly exceeds the rate of the message clocking pulses CLK. The last N samples are saved, and when a predetermined number of saved samples has a predetermined logic level, the logic level of output CCLK changes. Output CCLK stays at the new logic level until the number of saved samples having the predetermined logic level drops below the number which caused the output CCLK to change. Using numbers to describe an exemplary embodiment, digital correlator samples the input clock line CLK at a rate which is thirty-two times the message clocking rate, with the message sampling rate being controlled by clock RC2. The logic levels of the last five samples are saved. When three of the five saved samples are at the logic one level, output CCLK changes from a logic zero to a logic one. As long as at least three of the five saved samples are at the logic one level, output CCLK will stay at the logic one level. Once the number of saved samples which are at the logic one level drops below three, output CCLK switches back to the logic zero level. Thus, a noise pulse having a duration of two or less sample periods is ignored. Digital correlator 90 thus acts as a digital filter, providing a clean output signal CCLK only when the logic one level at the input of the digital correlator persists for more than one-half of its five sample period.

More specifically, the last five samples of the input CLK are saved in five D-type flip-flops 120, 122, 124, 126 and 128, which are connected to propagate the logic level of each sample from flip-flop 120 through flip-flop 128. Flip-flops 120 through 128 are clocked by clock RC2, which, as hereinbefore stated, is 32 times the rate of the message clocking pulses CLK.

The $\overline{Q}$ outputs of flip-flops 120 through 128 are inverted by inverter gates 130, 132, 134, 136 and 138, respectively, and applied to certain inputs of ten tri-input NAND gates 140, 142, 144, 146, 148, 150, 152, 154, 156 and 158. The output of inverter gate 130 is connected to inputs of NAND gates 140, 142, 144, 146, 148 and 150. The output of inverter gate 132 is connected to inputs of NAND gates 142, 144, 150, 152, 156 and 158. The output of inverter gate 134 is connected to inputs of NAND gates 140, 146, 150, 154, 156 and 158. The output of inverter gate 136 is connected to inputs of NAND gates 140, 142, 148, 152, 154 and 156. The output of inverter gate 138 is connected to inputs of NAND gates 144, 146, 148, 152, 154 and 158.

The outputs of NAND gates 140, 142, 144, 146 and 148 are connected to inputs of a NAND gate 160, and the outputs of NAND gates 150, 152, 154, 156 and 158 are connected to inputs of a NAND gate 162. The outputs of NAND gates 160 and 162 are connected to inputs of a NOR gate 164. The output of NOR gate 164 is connected to the D input of a D-type flip-flop 166. Flip-flop 166 is clocked by clock $\overline{RC2}$, and the Q output of flip-flop 166 is connected to output terminal CCLK via an inverter gate 168.

The ten tri-input NAND gates cover all of the combinations of any three-out-of-five, such that any three samples at the logic one level will cause the output of one NAND gate to go low, forcing the output of NAND gate 160 or the output of NAND gate 162 high. NOR gate 164 will thus no longer have two logic zero inputs, and its output goes low. The Q output of flip-flop 166 thus goes low, which is inverted to a logic one output at output terminal CCLK.

In the example illustrated by the graph of FIG. 4, clock pulse CLK goes high at 169 and the rising edges 170, 172 and 174 of RC2 clock pulses all detect a logic one level. Thus, after the third such detection, flip-flops 120, 122 and 124 all have a logic zero at their $\overline{Q}$ outputs which is inverted to a logic one by inverter gates 130, 132 and 134, respectively. This combination drives the output of NAND gate 150 low, the output of NAND gate 162 high, and the output of NOR gate 164 low. When flip-flop 166 is subsequently clocked by the rising edge 176 of clock $\overline{RC2}$, the Q output of flip-flop 166 goes low which is inverted to a true signal CCLK by inverter gate 168. Thus, clock CCLK goes high at 175.

Output terminal CCLK remains at the logic one level until the count of samples which are at the logic one level drops below three. When pulse CLK ceases at 177, rising edges 178, 180 and 182 of clock RC2 load three samples at the logic zero level into the sample-saving flip-flops, and all ten tri-input NAND gates output a logic one. Thus, NAND gates 160 and 162 output logic zeros, and NOR gate 164 outputs a logic one. When flip-flop 166 is subsequently clocked by rising edge 184 of clock $\overline{RC2}$, the Q output of flip-flop 166 goes high, and the inverter gate 168 outputs a logic zero to terminate the CCLK pulse at 186.

It will be noted that while the digital correlator 90 delays the start 175 of CCLK compared with the start 169 of CLK, the termination 186 of CCLK also lags the termination 177 of CLK, to provide substantially the same pulse duration.

The parity checking function 96 shown in block form in FIG. 2 may be performed by the circuit shown in FIG. 5. For purposes of example, the parity bit is selected to make the total number of logic ones in an SID message an odd number. Function 96 includes a D-type flip-flop 190, an exclusive OR (XOR) gate 192, and first and second inverter gates 194 and 196. Signal Q6 is applied to the reset input of flip-flop 190 via the first inverter gate 194, to provide a logic one at the $\overline{Q}$ output of flip-flop 190, which is inverted to a logic zero by the second inverter gate 196. Thus, signal $\overline{PER}$ is low when circuit 96 is reset. Input data CSID is applied to one input of XOR gate 192, the output of XOR gate 192 is applied to the D input of flip-flop 190, and the Q output of flip-flop 190 is applied to the remaining input of XOR gate 192. Clock CCLK is connected to the clock input CK of flip-flop 190.

Logic zeros in message CSID result in XOR gate 192 continuing to output a logic zero and the $\overline{Q}$ output remains high until the first logic one in the message is detected. The first logic one triggers flip-flop 96 and signal $\overline{PER}$ goes high to indicate odd parity. The second logic one results in two like inputs to XOR gate 192 and CCLK will clock a zero to the Q output, output $\overline{Q}$ goes high and signal $\overline{PER}$ goes low to indicate even parity. The third logic one again triggers flip-flop 190, and signal $\overline{PER}$ goes high to indicate odd parity, etc. Thus, if message CSID has an odd number of logic ones, output signal $\overline{PER}$ will be high, indicating that there is no parity error. If signal $\overline{PER}$ is low at the end of message CSID, a transmission error has occurred.

Ring counter and divider function 104 shown in block form in FIG. 2, may be provided by the circuit shown in FIG. 6. Function 104 includes an eight-bit ring counter 199 constructed of eight D-type flip-flops 200, 202, 204, 206, 208, 210, 212 and 214. Clock CCLK is inverted by an inverter gate 216, and the output of inverter gate 216 is applied to the reset inputs of the eight flip-flops. Thus, each clock pulse CCLK resets ring counter 199. When all eight flip-flops are reset, their $\overline{Q}$ outputs are arranged to provide a logic one for the D input of the first flip-flop 200 via NAND gates 216 and 218 and NOR gate 220. Thus, when the clock pulses CCLK cease at the end of a message SID, ring counter 199 propogates the logic one which was initially applied to flip-flop 200 through the ring counter.

Clock RC, which is provided by the oscillator circuit 106 shown in FIG. 2, has a clock rate selected to be 64 times the message clock rate CLK. Clock RC is divided by a divider 222, such as a six-bit counter, to provide an output clock RC2 which is thirty-two times the rate of clock CLK, and an output clock RC64 which is the same rate as the message clock CLK. Clock RC64 is connected to the clock inputs CK of the eight flip-flops via a gating function 224. Gating function 224 is enabled by a low signal from the Q output of the last flip-flop 214. When the logic one is propagated completely through the ring counter 199 and it reaches the Q output of flip-flop 214, gating function 224 ceases to pass RC64 clock pulses, and the ring counter remains in this condition until it is reset by the first clock pulse CCLK of the next message CSID.

In the operation of ring counter and divider function 104, each message clock pulse CCLK resets ring counter 199, maintaining a logic one at the D input of flip-flop 200, and enabling gating function 224 to pass clock pulses RC64. One or two missing clock pulses CCLK will not start any message processing functions in the controller, as the first such function is not initiated until the logic one being propagated through the ring counter reaches the Q output of the fourth flip-flop 206, which provides signal Q4. Three missing clock pulses CCLK thus frame the message CSID and start the message processing functions of the communication controller 72. At least nine missing clock pulses CCLK are required in order to guarantee the message processing functions. After Q4 goes high, outputs Q5, Q6 and Q7 successively go high and then low, until the Q output of flip-flop 214 goes high, which disables the gating function 224 to stop the clocking of the ring counter 199 until the next CSID message is clocked by CCLK pulses.

The enable function 100 shown in FIG. 2 may be performed by the circuit shown in FIG. 7. Enable function 100 includes a digital address comparator 230, an OR gate 231 a multiplexer 232, a flip-flop 234 which is enabled by a low enable input signal, an AND gate 236, and inverter gates 238, 240, 242, 244 and 246. Address comparator 230 compares the message address with the station address in comparator 230′, providing a true output signal C1 only when the address portion B1N–B7N of a message CSID matches the station address A0–A4. Output C1 is applied to one input of AND gate 236. Address comparator 230 also compares station address bits A5 and A6 with message bits B6N and B7N in comparator 230″, providing a true output signal C2 only when they match. Output C2 is applied to one output of OR gate 231 and the mode pin M is connected to the other input via inverter gate 242. The output of OR gate 231 is connected to another input of AND gate 236. Thus, in PI mode, output C2 is ignored, as only bits B1N–B5N define the controller address. In FC mode all seven station address bits A0–A6 must match bits B1N–B7N of the message address field.

The parity check signal $\overline{PER}$ provided by function 96 shown in FIG. 2, which is high when no parity error is detected, is applied to another input of AND gate 236.

The outputs $\overline{C20}$ and $\overline{C40}$ of the counting function 98 shown in FIG. 2, are applied to the A and B inputs of multiplexer 236 via inverter gates 238 and 240, respectively. The mode pin M is connected to the "select B" input SLB via inverter gate 242. The Y output of multiplexer 232 provides the final input to AND gate 236.

Control signal Q4 is applied to the enable input EN of flip-flop 234 via inverter gate 244. The $\overline{Q}$ output of flip-flop 234 provides the output signal DOUT via inverter gate 246.

If the communication controller 72 is in FC mode, the A input of multiplexer 232 is connected to the Y output, and if communication controller 72 is in PI mode, the B input is connected to the Y output. If the communication controller 72 is addressed by the CSID message, and the message contains the correct number of bits for the selected mode, FC or PI, and no parity error is detected, AND gate 236 will apply a logic one to the D input of flip-flop 234. Otherwise, AND gate 236 provides a logic zero output. When a message has been framed and control signal Q4 goes high, flip-flop 234 transfers the logic level at the D input to the Q output, providing the inverted logic level at the $\overline{Q}$ output. Thus, if a logic one is applied to the D input, the $\overline{Q}$ output of flip-flop 234 will go low when signal Q4 appears, providing a true enable signal DOUT. If a logic zero is applied to the D input of flip-flop 234 at the time signal Q4 goes high, the enable signal DOUT will remain at the logic zero level.

Figure 8:
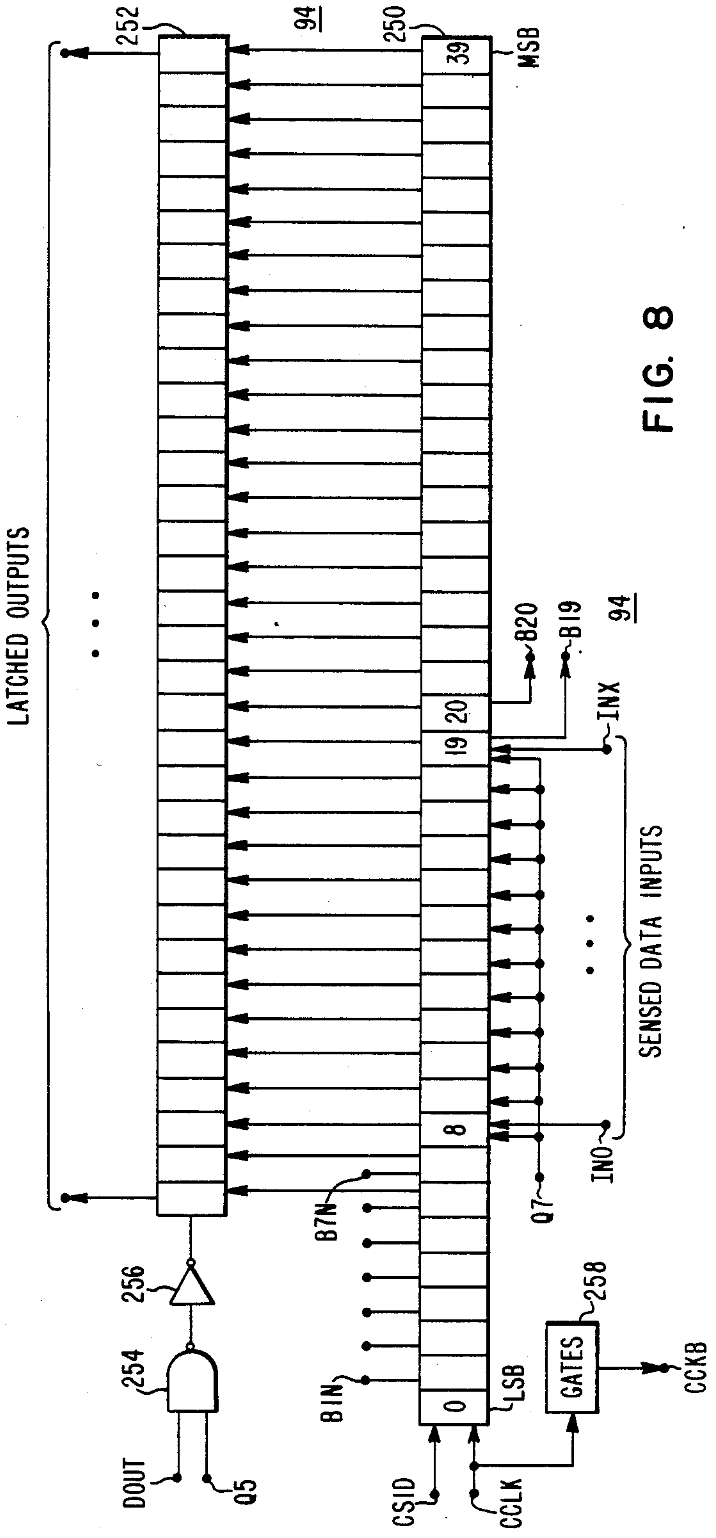
FIG. 8 is a schematic diagram of a shift register and data latch circuit which may be used for this function which is shown in block in FIG. 2.

The shift register and data latch function 94 shown in FIG. 2 may be provided by the circuit shown in FIG. 8. Function 94 includes a forty-bit shift register 250 and a thirty-four bit data latch 252. Shift register 250 includes a serial input connected to the LSB of shift register 250 to receive either a twenty-bit or a forty-bit input message CSID. A serial output B19 is provided at the twentieth bit position, a serial output B20 is provided at the twenty-first bit position, parallel load inputs are provided at bit positions 8–19, parallel address outputs B1N–B7N are provided from bit positions 1–7, and parallel outputs are provided from bit positions 6–39. The parallel shift register outputs from bit positions 6–39 are applied to inputs of the thirty-four bit data latch 252. In FC mode, only bit positions 8–19 contain data. In PI mode, bit positions 6–39 contain data.

Enable signal DOUT and control signal Q5 are logically combined by NAND gate 254 and an inverter gate 256 to provide a signal which is connected to the latch input of data latch 252. If the enable signal DOUT is true, when control signal Q5 goes to a logic one, a logic one is applied to latch 252 which latches the data applied to its inputs.

Control signal Q7, which goes to a logic one after the data in message CSID has been latched, loads bit positions 8–19 with data from the sensed inputs INO-INX. INX is IN11 for FC mode and IN3 for PI mode. Thus, a new message is then ready to be clocked out when the next message CSID is clocked into shift register 250. The address appearing in bit positions B1N–B7N is undisturbed, as it is the address of the communication controller 72 which is sending the message SOD back to the elevator controller 32. The logic level of the LSB of message SOD is provided by the parity bit generator 112. Clock CCLK is delayed via a gating function 258 to provide delayed clock CCKB which is used to clock a flip-flop which checks the parity of each new bit appearing in bit position B19 of shift register 250, slightly after the message clock CCLK advances the shift register.

Figure 9:
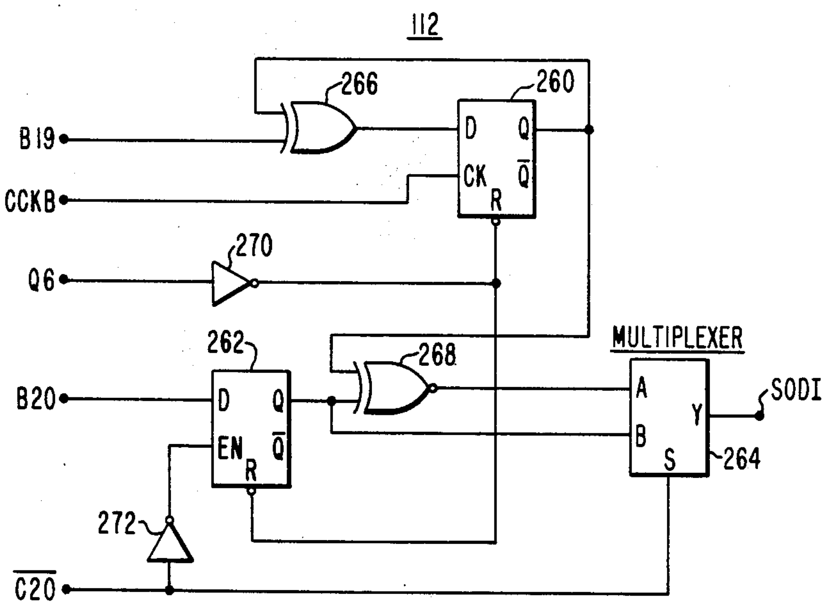
FIG. 9 is a schematic diagram of a parity bit generator which may be used for this function which is shown in block form in FIG. 2.

The parity generator function 112 shown in FIG. 2, may be provided by the circuit shown in FIG. 9. The parity generator function 112 includes a D-type flip-flop 260, an "enable" flip-flop 262, a multiplexer 264, an exclusive OR (XOR) gate 266, an exclusive NOR (XNOR) gate 268, and inverter gates 270 and 272. Control signal Q6 resets flip-flops 260 and 262 via an inverter gate 270. Flip-flop 260 and XOR gate 266 keep track of the number of bits in the output message as it is being clocked out, in a manner which is similar to the parity check function 96 shown in FIG. 5, with the Q output of flip-flop 260 being a logic zero when the number of logic one bits is even, and a logic one when the number of logic one bits in the message is odd. The Q output of flip-flop 260 is applied to one input of XNOR gate 268, and the output of XNOR gate 268 is applied to the A input of multiplexer 264.

Output $\overline{C20}$ from the counting function 98 shown in FIG. 2 is applied to the enable input EN of flip-flop 262. Thus, flip-flop 262 is enabled to pass SOD message bits from serial output $\overline{B20}$ of shift register 250 to its Q output until signal $\overline{C20}$ goes low at the twentieth clock pulse CCLK. After the twentieth clock pulse CCLK, only nineteen message bits have been clocked out of terminal B20. When signal $\overline{C20}$ goes low, flip-flop 262 provides a logic zero to input of XNOR gate 268. The Q output of flip-flop 262 is also applied to the B input of multiplexer 264. Clock counter output $\overline{C20}$ is applied to the select input of multiplexer 264. The initially high signal $\overline{C20}$ selects input B, allowing nineteen SOD message bits to pass through multiplexer 264 to serial output terminal SODI. When signal $\overline{C20}$ goes low after twenty clock pulses CCLK, multiplexer 264 connects its A input to the output terminal SODI. The delayed twentieth clock pulse CCKB clocks flip-flop 260, providing a zero at the input of XNOR gate 268 if the message contained an even number of logic one bits. The output of XNOR gate 268 with two logic zero inputs goes to a logic one which thus becomes the LSB of the twenty-bit output message SOD. Flip-flop 260 provides a logic one at the input of XNOR gate 268 if the message being clocked contained an odd number of logic one bits. The output of XNOR gate 268 with different logic level inputs goes to a logic zero, which thus becomes the LSB or parity bit of the twenty-bit output message SOD. Thus, add parity for the twenty-bit SOD message is always transmitted.

As shown in FIG. 2, serial output message SODI passes through the tri-state driver 116 to output terminal SOD, since the enable signal DOUT is maintained at the logic one level until the next message is framed.

Figure 11:
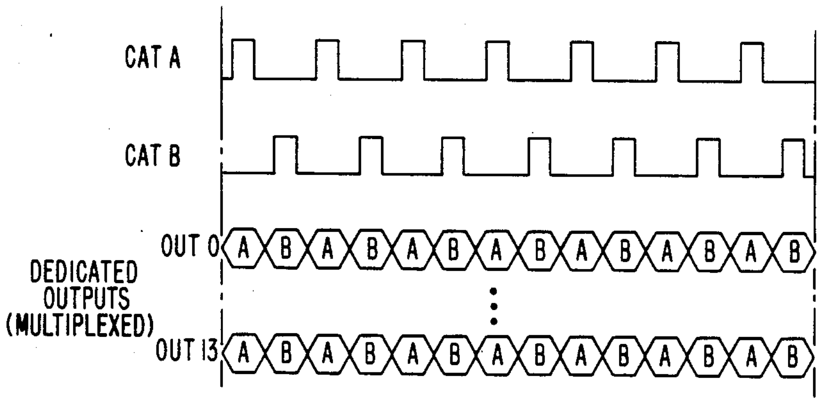
FIG. 11 is a graph which illustrates the multiplexing function performed by the circuit shown in FIG. 10.

The multiplexer and driver function 108 shown in FIG. 2 may be provided by the circuit shown in FIG. 10. FIG. 11 is a graph which will also be referred to while describing function 108. Function 108 includes fourteen multiplexers, with the first being referenced 280 and the fourteenth 282. Each multiplexer has its A and B inputs connected to the output of different data latch elements of latch 252 shown in FIG. 8. The Y outputs of the fourteen multiplexers are connected to the dedicated output terminals OUT0–OUT11, and to terminals OUT12 and OUT13, which are outputs in PI mode, via drivers, such as drivers 284 and 286. The "select" inputs S of the fourteen multiplexers are connected to be responsive to the mode pin M and clock RC64 via inverter gates 288, 290, 292 and 294, and a NAND gate 296. Mode pin M is connected to an input of NAND gate 296 via inverter gate 288, clock RC64 is connected to the remaining input of NAND gate 296 via serially connected inverter gates 290 and 292, and the output of NAND gate 296 is applied to the select inputs S of the fourteen multiplexers via inverter gate 294.

In FC mode, pin M is high and NAND gate 296 outputs a logic one which is inverted to a logic zero by inverter gate 294. A logic zero selects the A inputs to be connected to the Y outputs.

In PI mode, pin M is low which enables NAND gate 296 to pass clock RC64. Thus, the Y outputs of the fourteen multiplexers are switched between the A and B inputs at the rate of clock RC64. In PI mode, the A inputs of the fourteen multiplexers control the fourteen segments of the least significant (LS) digit 298, and the B inputs of the fourteen multiplexers control the fourteen segments of the most significant (MS) digit 300. Digits 298 and 300 collectively form the digital car position indicator 302.

Function 108 further includes a D-type flip-flop 304, NAND gates 306 and 308, and inverter gates 310 and 312. Clock RC is applied to the clock input CK of flip-flop 304, and clock RC64 is applied to the D input of flip-flop 304 and to an input of NAND gate 306. The Q output of flip-flop 304 is applied to the remaining input of NAND gate 306. The $\overline{Q}$ output of flip-flop 304 is applied to an input of NAND gate 308, and clock RC64 is applied to the remaining input of NAND gate 308. The output of NAND gate 306 is inverted by inverter gate 310 to provide an output signal CATA which is connected to the cathode of the LS digit 298. The output of NAND gate 308 is inverted by inverter gate 312 to provide an output signal CATB which is connected to the cathode of the MS digit 300.

As illustrated in FIG. 11, output signals CATA and CATB function as non-overlapping clock signals which energize their associated digit of the digital car position indicator while the fourteen dedicated outputs are providing segment information for that digit. The rate is selected to be greater than the persistence of the human eye, causing each digit of the car position indicator 302 to appear to be continuously energized.

FIG. 1 illustrates a typical use for the latched data which appears at the dedicated outputs OUT0–OUT11 in an FC input message SID, and it also illustrates typical sensed data which may be packed into the output message SOD. The sensed data is applied to the dedicated inputs INO–INX shown in FIG. 2. As illustrated in FIG. 1, the down hall call pushbutton 56 is connected in a serial circuit which starts from a source 320 of unidirectional potential, and continues through a resistor 322 and pushbutton 56 to ground. Indicator lamp 58, which is associated with pushbutton 56, is connected from source 320 to ground via serially connected resistors 324 and 326, with lamp 58 and resistor 322 being connected in parallel at junction 330. A solid state switching device, such as a field effect transistor 328, has its drain D connected to the junction 330, its source S connected to ground, and its gate G connected to receive one of the outputs OUT0–OUT11. The junction 332 between resistors 324 and 326 is used to sense actuation of pushbutton 56, with junction 332 being connected to one of the dedicated inputs INO–INX.

Normally, a voltage appears at junction 332 of the voltage divider which includes resistors 322, 324 and 326. When pushbutton 56 is actuated, junction 330 is connected to ground, and the voltage at junction 332 drops to ground level. When the associated input is at ground potential, this fact is sensed and sent back to the elevator controller 32 as part of serial message SOD. The elevator controller 32 receives the hall call indication and acknowledges receipt thereof by sending a message SID to the associated communication controller 72, with a logic one being provided in the data location of the message which will be latched to provide gate drive for the solid state switch 328. When switch 328 turns on, lamp 58 is energized. When the hall call is answered, a message SID will be prepared by the elevator controller 32 and sent to this communication controller 72, with this message containing a logic zero at the location which will remove gate drive from switch 328 and turn lamp 58 off.

In summary, there has been disclosed a new and improved versatile communication controller for elevator communication control which may be used either for floor controller functions or car position indicator functions, simply by controlling the logic level of a single input pin. This single input pin M is internally connected to a logic one voltage level with a pull-up resistor, requiring only that pin M be grounded when the communication controller is to be used in PI mode. Grounding pin M automatically enables the communication controller to accept forty-bit messages, instead of twenty-bit messages, it automatically activates a multiplexing function such that two fourteen-segment digits can use fourteen outputs of the controller, and it automatically converts certain of the communication controller terminals which are inputs in FC mode to output terminals. Communication controller 72 also effectively guards against erratic operation due to noise in the data link by digitally correlating the clock and input message signals via digital correlators which ignore line noise and provide clean digital signals in response to actual signals received on the clock and input message lines. Communication controller 72 further guards against erratic operation by requiring at least three missing message clock pulses to trigger message framing. Thus, one or two missing clock pulses will not start message processing functions in the communication controller.

Once internal message processing starts, the processing steps are sequenced and synchronized by a ring counter which is effectively under the control of the message clock line CLK provided by the elevator controller 32. For example, each message clock pulse CCLK resets the ring counter, requiring three missing clock pulses to frame the message, and at least nine missing clock pulses are required in order to complete message processing.

The communication controllers operate in a full duplex mode with the elevator bank controller, as the clocking of an input message SID loads the message into the shift registers of all communication controllers, regardless of whether the communication controller is in FC or PI mode. The clocking in of a message simultaneously clocks out a message SOD from the communication controller which was addressed by the preceding message. In other words, information is sent from a communication controller to the elevator bank controller when it's return data interface, i.e., the tri-state driver, is enabled. This interface is enabled for one message following the reception of a valid received message from the elevator bank controller. Thus, a message transmission from the elevator bank controller to one particular address controller results in the simultaneous reception of information from the previously addressed communication controller.

Reception of a valid message is insured by each communication controller, even though the elevator bank controller interleaves different length SID messages, by circuitry which counts the number of bits in each SID message. A mode pin M determines if the correct count should be twenty or forty. If this correct clock count is not achieved, the message is ignored. The parity of each incoming message is also checked. If it is not correct, the message is ignored. The address in the address field of the SID message is compared with the unique station address assigned to each communication controller. If the addresses do not match, the message is ignored.

All return messages SOD have a twenty-bit length. Thus, all return messages are clocked by an in-coming message regardless of whether the in-coming message has twenty bits or forty bits. The return message is prepared in the shift register of a communication controller which just received a valid SID message, by retaining the address in the address field of the SID message, and by parallel loading the data field with sensed data, after the data in the SID message has been latched. A parity bit is added by a parity generator, as the SOD message is clocked out.

We claim:

1. An addressable elevator communication controller for receiving spaced serial input messages via a data link having a clock line for providing message clocking pulses, an input data line, and an output data line, with each input message including address and data portions, comprising:

address means providing a station address, shift register means having a clock input, a serial input, a serial output, parallel inputs, and parallel outputs, said shift register means having its clock input connected to the clock line and its serial input connected to the input data line for receiving each serial input message in synchronism with the message clocking pulses, enable means for providing an enable signal when said shift register means receives a valid input message which includes said station address, means responsive to said enable signal for unloading the data portion of a serial input message via the parallel outputs of said shift register means, means for preparing a serial output message in said shift register means via said parallel inputs, after said shift register means has been unloaded, and means responsive to said enable signal for operatively connecting the serial output of said shift register means to the output data link, at least until the next serial input message has been received by said shift register means, whereby the loading of said next serial input message into said shift register means simultaneously clocks the serial output message to the output data line, regardless of the station address in the next serial input message.

2. The communication controller of claim 1 including first digital correlator means connected between the input data line and the serial input of the shift register means, said first digital correlator means including means for sampling the input data line at a sampling rate which exceeds the rate of the message clocking pulses, means for storing the last N samples, and logic means for providing an output having a predetermined logic level when a predetermined number of stored samples has a predetermined logic level.

3. The communication controller of claim 2 wherein the means which provides the output having a predetermined logic level when a predetermined number of samples has a predetermined logic level, continues to provide the predetermined logic level until the number of stored samples having the predetermined logic level falls below the predetermined number.

4. The communication controller of claim 2 including second digital correlator means, said second digital correlator means being connected between the clock line and the clock input of the shift register means.

5. The communication controller of claim 1 wherein a valid message has a predetermined number of bits, including a parity bit, and wherein the enable means includes comparator means for comparing the address portion of a message with the controller address, and further including counter means for counting the clock pulses which clock a message into the shift register means, and parity means for determining if the parity of the message is correct, whereby the enable means provides the enable signal only when the communication controller is correctly addressed, the message has the correct number of bits, and there is no parity error.

6. The controller of claim 1 including means for selecting one of first and second controller operating modes, wherein the enable means provides an enable signal only when a serial message has a predetermined number of bits, which predetermined number is different in the first and second controller operating modes.

7. The controller of claim 6 wherein the shift register means has first and second ends, with the serial input being at the first end, and the serial output intermediate said first and second ends, such that a serial message of like bit length is clocked to the output data line in each of the first and second controller operating modes.

8. The controller of claim 6 wherein the means which unloads the data portion of the shift register means includes latch means, multiplexer means, and output terminals, with said multiplexer means being connected between said latch means and said output terminals, and wherein the selection of a predetermined one of said controller operating modes activates said multiplexer means.

9. The controller of claim 8 including first and second fourteen element display digits each having a cathode electrode, the output terminals include fourteen terminals each of which is connected to an element on each of said first and second display digits, and first and second output terminals connected to the cathode electrodes of said first and second display digits, respectively, the latch means includes at least twenty-eight latch elements, the multiplexer means includes fourteen dual input, single output multiplexer elements, with each multiplexer element being connected to selectively connect two predetermined latch elements to one of the fourteen output terminals, and including clock means for switching the output of each multiplexer element between its dual inputs at a predetermined rate, and means for alternately energizing the first and second output terminals connected to the cathode electrodes of the first and second display digits at the same predetermined rate, when a predetermined one of said operating modes is selected.

10. The controller of claim 1 including ring counter means which provides a series of control signals after a predetermined number of missing clock pulses on the clock line, after a message has been clocked into the shift register means, with the enable means being responsive to a predetermined one of said control signals.

11. The controller of claim 10 wherein the means which unloads the data portion of the shift register means is responsive to a predetermined second one of the control signals, in addition to being responsive to the enable signal.

12. The controller of claim 11 wherein the means which prepares the serial return message in the shift register means via the parallel inputs includes a third predetermined one of the control signals.

13. The controller of claim 12 wherein the last control signal disables the ring counter means until clock pulses appear on the clock line to clock a new message into the shift register means.

14. A digital correlator for connection between a serial data line over which digital signals are sent by an elevator controller at a predetermined maximum rate, and a communication controller, comprising:

means for sampling the serial data line at a sampling rate which exceeds said predetermined maximum rate, means for storing the last N samples, and means providing an output having a predetermined logic level when a predetermined number of stored samples has a predetermined logic level.

15. The digital correlator of claim 14 wherein the means for providing an output having a predetermined logic level when a predetermined number of stored samples has a predetermined logic level, continues to provide the output having the predetermined logic level until the number of stored samples having the predetermined logic level falls below the predetermined number.

* * * * *